United States Patent
Kim (10) Patent No.: US 7,800,990 B2
(45) Date of Patent: Sep. 21, 2010

(54) METHOD FOR SELECTING FOCUS SERVO PROCESS

(75) Inventor: Kyeong Min Kim, Ahnyang-si (KR)

(73) Assignee: LG Electronic Inc., Seoul (KR)

( * ) Notice: Subject to any disclaimer, the term of this patent is extended or adjusted under 35 U.S.C. 154(b) by 428 days.

(21) Appl. No.: 11/972,534

(22) Filed: Jan. 10, 2008

(65) Prior Publication Data

US 2008/0175117 A1 Jul. 24, 2008

(30) Foreign Application Priority Data

Jan. 11, 2007 (KR) .............. 10-2007-0003107
Dec. 4, 2007 (KR) .............. 10-2007-0124755

(51) Int. Cl.
*G11B 7/00* (2006.01)

(52) U.S. Cl. .............. 369/44.29; 369/44.32; 369/44.35; 369/44.41

(58) Field of Classification Search ....................... None
See application file for complete search history.

(56) References Cited

U.S. PATENT DOCUMENTS

| | | | | |
|---|---|---|---|---|
| 5,708,638 A | * | 1/1998 | Braat et al. .............. | 369/44.29 |
| 2002/0031062 A1 | * | 3/2002 | Izumi et al. .............. | 369/44.41 |
| 2002/0089905 A1 | * | 7/2002 | Miyazaki et al. ......... | 369/44.23 |
| 2004/0165493 A1 | * | 8/2004 | Fukui ....................... | 369/44.32 |
| 2006/0261243 A1 | * | 11/2006 | Park et al. ................ | 250/201.5 |

* cited by examiner

*Primary Examiner*—Christopher R Lamb
(74) *Attorney, Agent, or Firm*—Birch, Stewart, Kolasch & Birch, LLP (57) ABSTRACT

Provided is a focus servo process automatic selecting method. In a related art optical pickup apparatus, only one of AD and DAD is selected and used when a focus servo is performed for disk detection and a focus-on operation. According to the method, servo crosstalk values of the two focus servo processes are compared and a suitable focus servo process is automatically selected, so that an optimum focus servo is realized.

13 Claims, 14 Drawing Sheets

FOCUS ERROR SIGNAL OF AD PROCESS

SERVO CROSSTALK WHEN MAIN BEAM
AND SUB-BEAMS ARE ADDED

METHOD FOR SELECTING FOCUS SERVO PROCESS

CROSS-REFERENCE TO RELATED APPLICATIONS

The present application claims priority under 35 U.S.C. 119 and 35 U.S.C. 365 to Korean Patent Application No. 10-2007-0003107 (filed on Jan. 11, 2007) and 10-2007-0124755 (filed on Dec. 4, 2007), which are hereby incorporated by reference in its entirety.

BACKGROUND

The present disclosure relates to a focus servo process automatic selecting method for automatically selecting one of astigmatism detection (AD) and differential astigmatism detection (DAD) before a focus-on operation of an optical pickup apparatus to realize an optimum focus servo.

A recent optical pickup device of a disk driver detects various storing media such as digital versatile disk (DVD) ±recording (R), DVD±rewritable (RW), DVD±R double layer (DL), and DVD random access memory (RAM) to play the medium. An optical pickup device of a DVD system can play disks having different thicknesses, track pitches, and data densities using one photodetector. Also, the optical pickup device performs an operation of determining the kind of an inserted disk upon insertion of the disk. This operation is simultaneously performed with a focus servo operation of condensing a beam on a disk surface. Generally, the optical pickup device determines the kinds of various disks using a time difference between a time at which a signal is reflected by a data surface of a DVD, and a time at which the signal reflected by the surface of the DVD is incident.

Currently, most of optical pickup focus control is performed using AD with respect to a DVD±R disk, an RW disk, and an R DL disk, and is performed using DAD with respect to a DVD RAM disk.

SUMMARY

A noise is indispensably generated during a focus servo control operation. While a beam moves between a land and a groove along a track surface, a control signal of horizontal tracking servo is introduced to a control signal of a vertical focusing servo, which is referred to as servo crosstalk.

The servo crosstalk is generated when a sinusoidal noise wave whose center is offset by a predetermined value is inserted into a focus servo signal. The servo crosstalk deteriorates a characteristic of recording and reproducing signals, but the amplitude and the offset size of the servo crosstalk may considerably reduce depending on cases in a control process of superposing a main beam and sub-beams as in a DAD process, so that the servo crosstalk may be effectively suppressed.

However, an AD process controlling an optical pickup using only a main beam can be more advantageous for a low density disk, not a high density disk such as a DVD RAM and a blue disk (BD), and an efficient control method for these disks has been required. To effectively control an optical pickup, the present disclosure allows one of an AD control process and a DAD control process to be automatically selected when necessary to perform an optimum focus servo operation regardless of the kind of a disk.

The details of one or more embodiments are set forth in the accompanying drawings and the description below. Other features will be apparent from the description and drawings, and from the claims.

DETAILED DESCRIPTION OF THE EMBODIMENTS

To resolve the above-described technical limitation, the essence of and difference between an AD process and a DAD process need to be understood.

Astigmatism is one of Seidel's five aberrations in an optical system such as a lens having a symmetric axis. The astigmatism is an aberration in which an image of an object point separated from a principal axis is not formed as a complete point but blurred in a ring shape or radially. The astigmatism is generated when the optical system has other optical force with respect to two light bundles perpendicular to each other.

When an object is not located on an optical axis, two light bundles different from each other may exist. Here, a plane of light passing through an optical axis is called a tangential plane.

Also, another plane of light that does not pass through the optical axis on the optical system is called a sagittal plane. Generally, since light of a tangential plane is focused closer than light of a sagittal plane, an aberration is generated.

The astigmatism is distinctly generated in a photodetector of an optical pickup device. Light that has been reflected by a disk plane and passed through an objective lens and a grating (diffraction grating) is focused as one main beam and two sub-beams to the photodetector.

At this point, all of the main beam and the sub-beams focused on each detection cell of the photodetector (refer to FIGS. 1A and 2A in which each of three detectors is divided into four equal cells) have a signal including a servo crosstalk amount added thereto besides a main signal. At this point, a control process using only the main beam with the sub-beams ignored is called AD. A control process using combination of the main beam and the sub-beams is called DAD.

Embodiments of the present disclosure will be described in more detail with reference to the accompanying drawings.

Figure 1A:
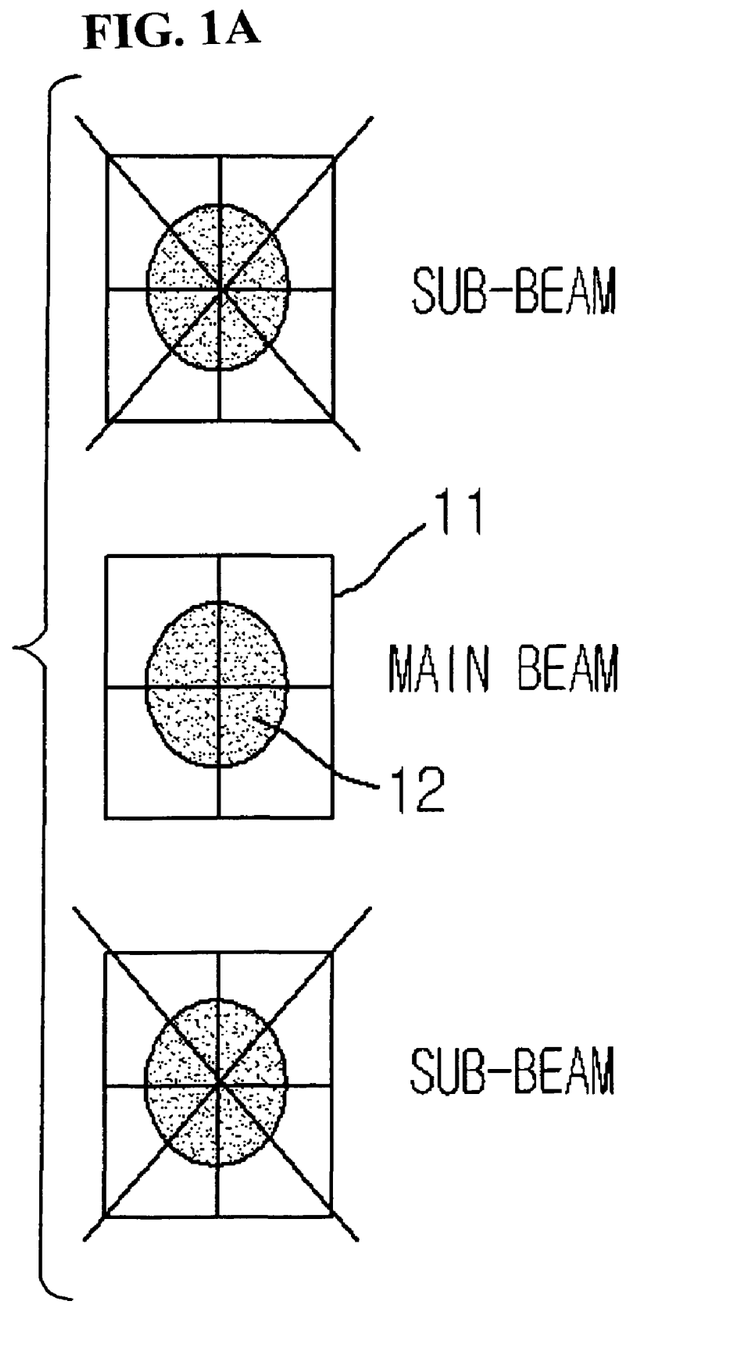
FIG. 1A to FIG. 1C are views illustrating a focus error signal and a servo crosstalk graph of a main beam in an AD process.

FIG. 1A illustrates a focus error signal in an AD process of performing a focus servo operation depending on only a main beam with sub-beams ignored while a beam is focused on a photodetector cell. The focused beam noted by reference numeral 12 of FIG. 1A generates a focus error signal 13 of FIG. 1B. A servo crosstalk signal having a wave shape and introduced by a very small amount from a tracking signal onto a wave-shaped curve of the focus error signal 13 is illustrated as the graph 14 of FIG. 1C.

Figure 1B:
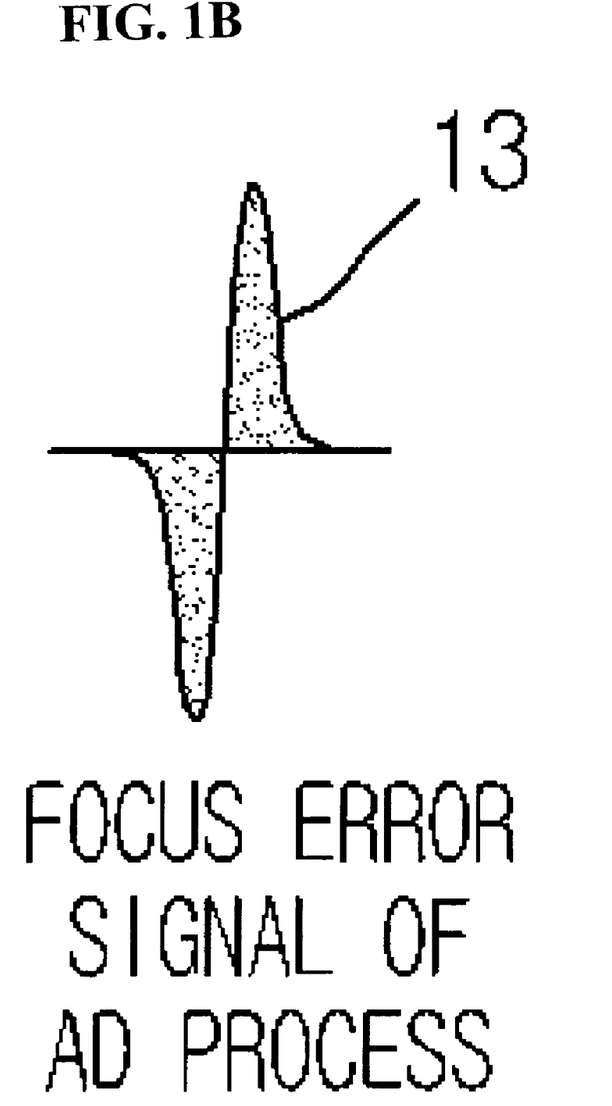
Figure 1C:
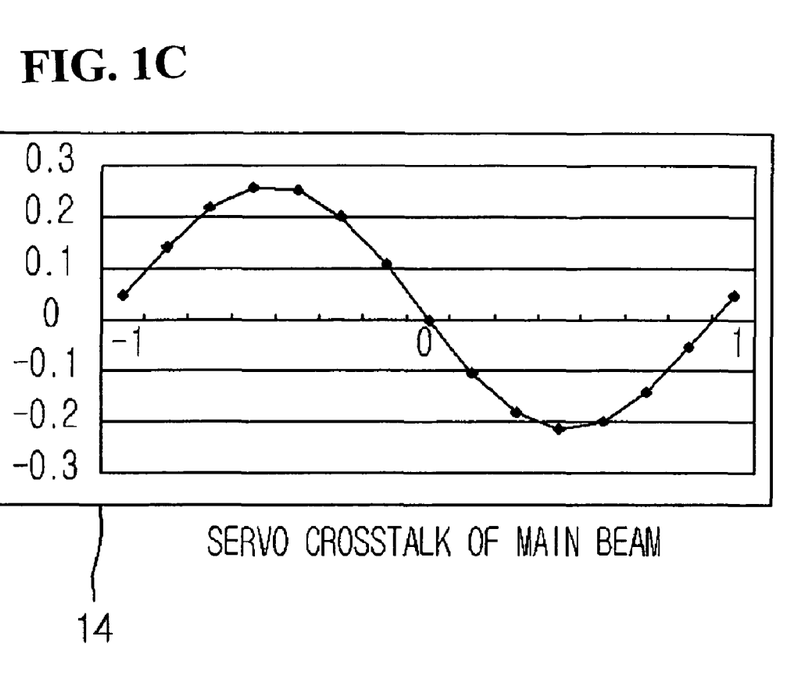
Figure 2A:
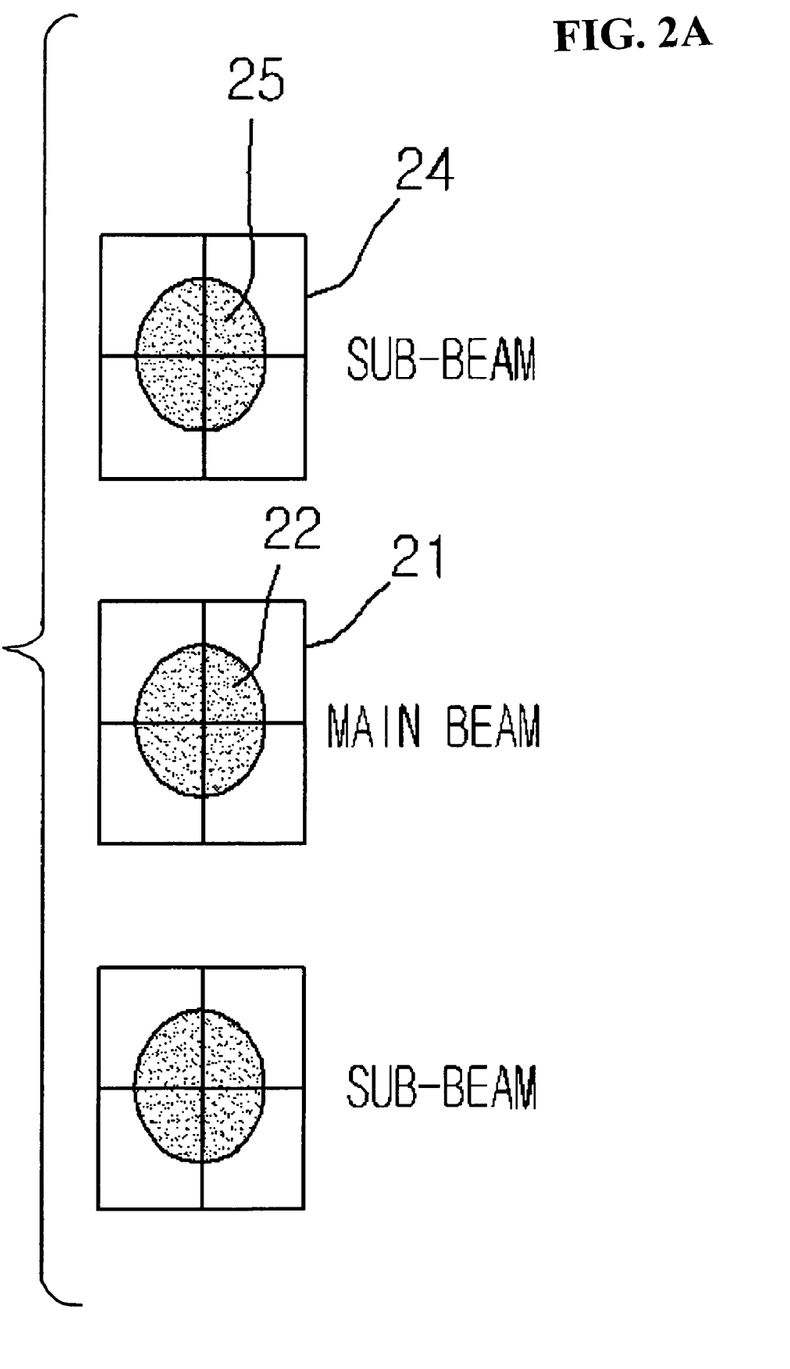
FIG. 2A to FIG. 2D are views illustrating a focus error signal and a servo crosstalk graph of a main beam and sub-beams in a DVD process.

In the servo crosstalk signal 14 of FIG. 1C, −1 on an x-axis represents a lens is located on a land of a disk, 0 represents the lens is located on a groove of a disk, and +1 represents the lens is located on the next land. Assuming that an arbitrary standard value is determined to be 1, an y-axis represents a ratio of a value to the arbitrary standard value. Here, the arbitrary standard value can be a focus error signal of the main beam, that is, a peak-to-peak value of the focus error signal 13 of FIG. 1B.

The servo crosstalk signal generates fine waves to a light signal to disturb a signal characteristic, and consequently hinders accurate recording or reproduction of data even after it is focused-on (state where a beam focused in the photodetector cell on the left of FIG. 1 becomes a circle).

Figure 2B:
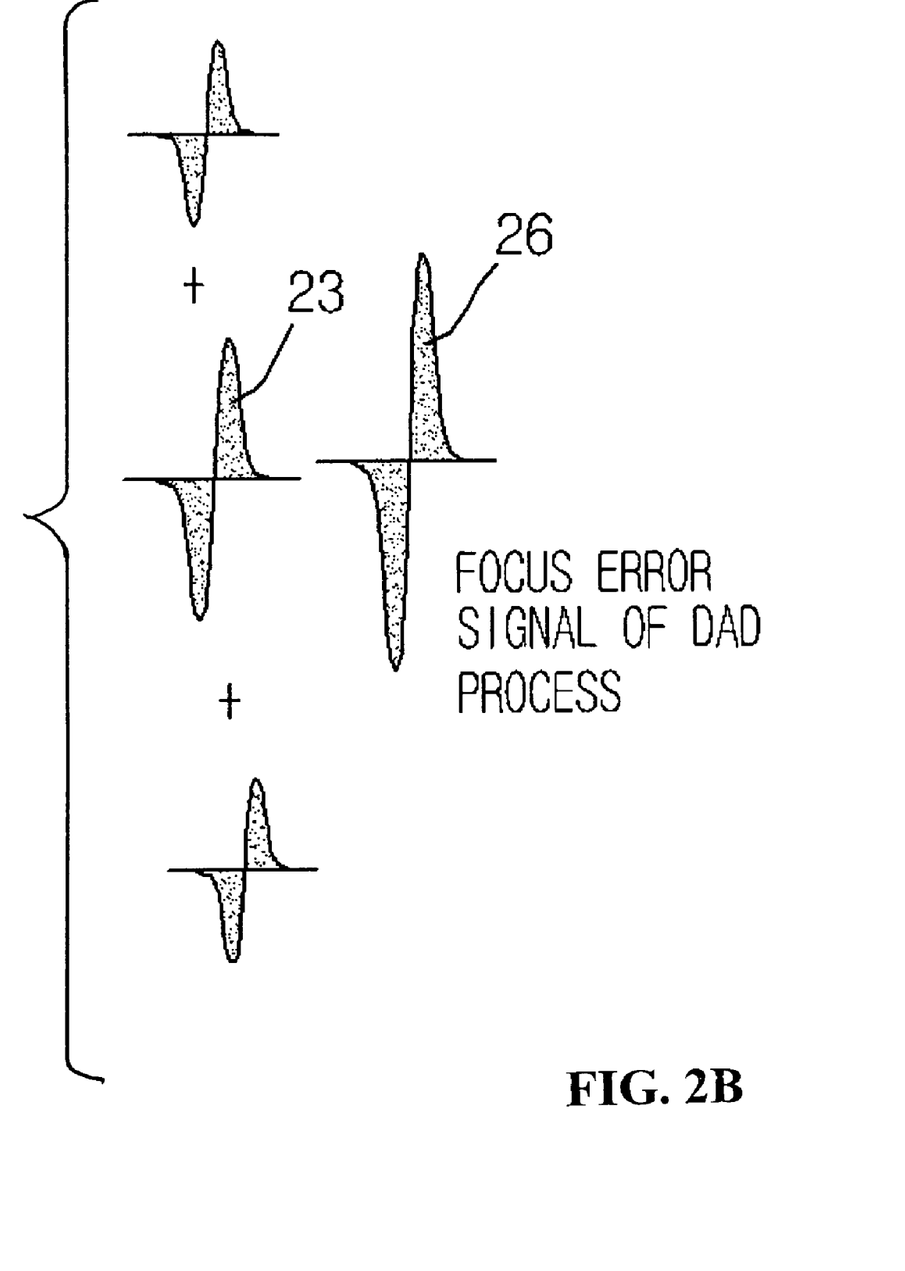

Also, FIG. 2A to FIG. 2D illustrate a focus error signal while a DAD process utilizing sub-beams focused above and below the main beam is used. Referring to FIG. 2B, when the main beam and the sub-beams are simply added, a focus error signal whose amplitude increases even more is detected. The focus error signal is more helpful in performing a focus-on operation (a state where a beam focused on a photodetector cell on the left of FIG. 2, more specifically, on a phtodetector cell on the main beam becomes a circle) using a differential push-pull (DPP) method because the focus-on operation can be easily controlled using the increased amplitude). Accordingly, the focus-on operation gets easy. However, when the phases of the sub-beams are the same as that of the main beam, superposition of waves where servo crosstalks of the main beam and the sub-beams are added is generated, so that an amount of serve crosstalk increases even more.

Figure 2C:
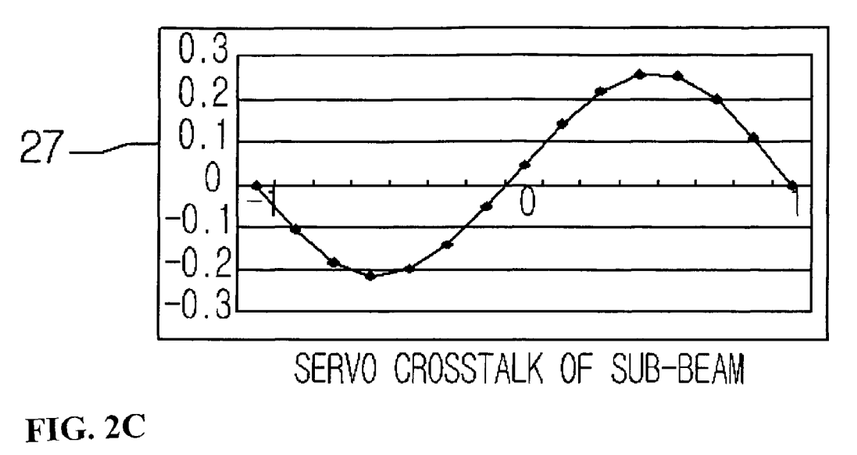
Figure 2D:
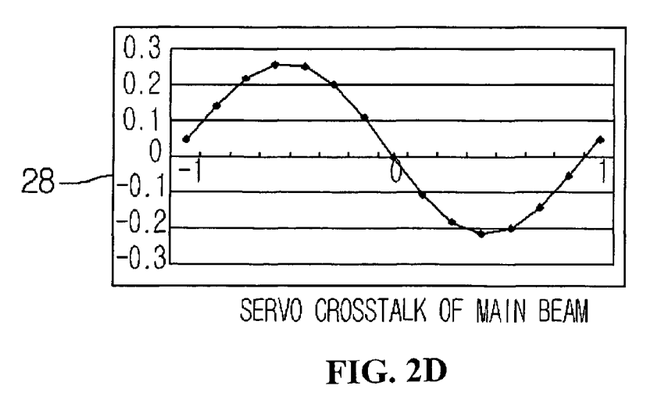

To remove the increased crosstalk, a DPP-main-sub method moves a sub-beam to a track by a predetermined amount to change the phase of a wave and combines a main beam with the sub-beams, so that a result equivalent to wave attenuation as illustrated in FIGS. 2C and 2D is achieved, and an entire servo crosstalk amount obtained by adding the main beam and the sub-beams considerably reduces.

In the servo crosstalk signals 27 and 28 of FIGS. 2C and 2D, −1 on an x-axis represents a lens is located on a land of a disk, 0 represents the lens is located on a groove of a disk, and +1 represents the lens is located on the next land. Assuming that an arbitrary standard value is determined to be 1, an y-axis represents a ration of a value to the arbitrary standard value. Here, the arbitrary standard value can be a focus error signal of the main beam, that is, a peak-to-peak value of the focus error signal 23 of FIG. 2B.

Figure 3:
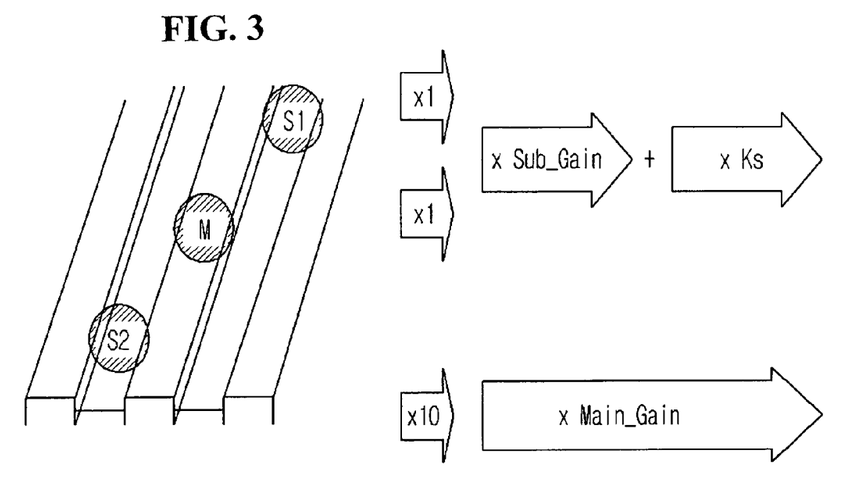
FIG. 3 is a view illustrating a main beam M and sub-beams S1 and S2 are formed on a disk track, and a process of adding the three beams.
Figure 4A:
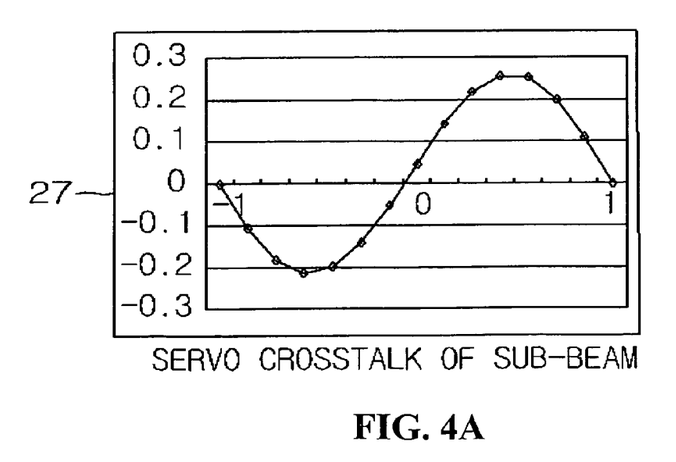
FIG. 4A to FIG. 4C are graphs illustrating servo crosstalks of FIG. 3 are added.
Figure 4B:
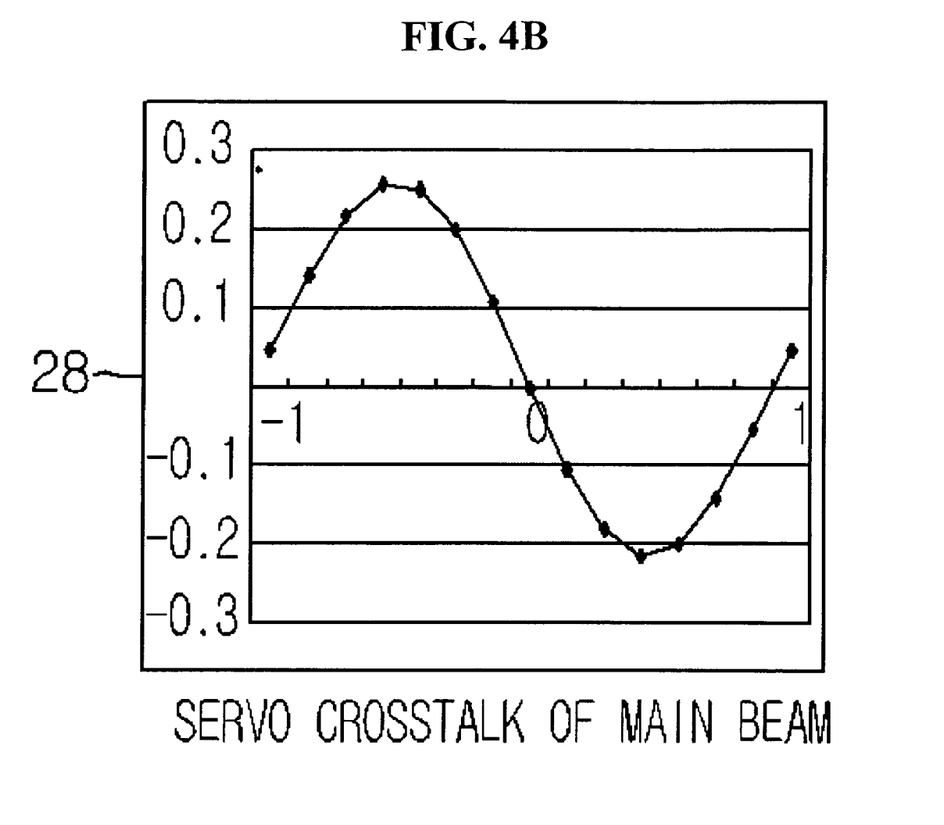

Referring to FIGS. 3 and 4A to 4C, the main beam is located on a land and the sub-beams are located on grooves (left side of FIG. 3), a DAD process having a characteristic of adding waves whose phases are opposite to each other to reduce the composite wave consequently adds servo crosstalk of the main beam whose phase has been changed and servo crosstalk of the sub-beams as illustrated in FIGS. 4A and 4B, so that an entire servo crosstalk (FIG. 4C) reduces. Also, when an offset adjust operation of removing an offset component using a transverse signal is performed, servo crosstalk extremely reduces.

The left side of FIG. 3A illustrates mechanism in which the sub-beams S1 and S2 located on grooves, and the main beam M located on a land are added with phases opposite to each other to achieve wave reduction in a DAD process. At this point, an operation of offsetting the sub-beam by half of a track pitch is performed using a DPP-main-sub method, which is a tracking control method of controlling the direction of a track.

Since DC voltages and AC amplitudes of the main beam and the sub-beam are different from each other, a value Ks as a correcting operator is added to the sub-beam in a DAD process as illustrated in the right side of FIG. 3. The value Ks is the same as a correcting operator Ks of the DPP-main-sub control.

When an offset adjust operation is performed using a transverse signal upon generation of a signal having a small amplitude and a small offset amount, a light signal having excellent recording and reproducing characteristics is obtained.

Figure 4C:
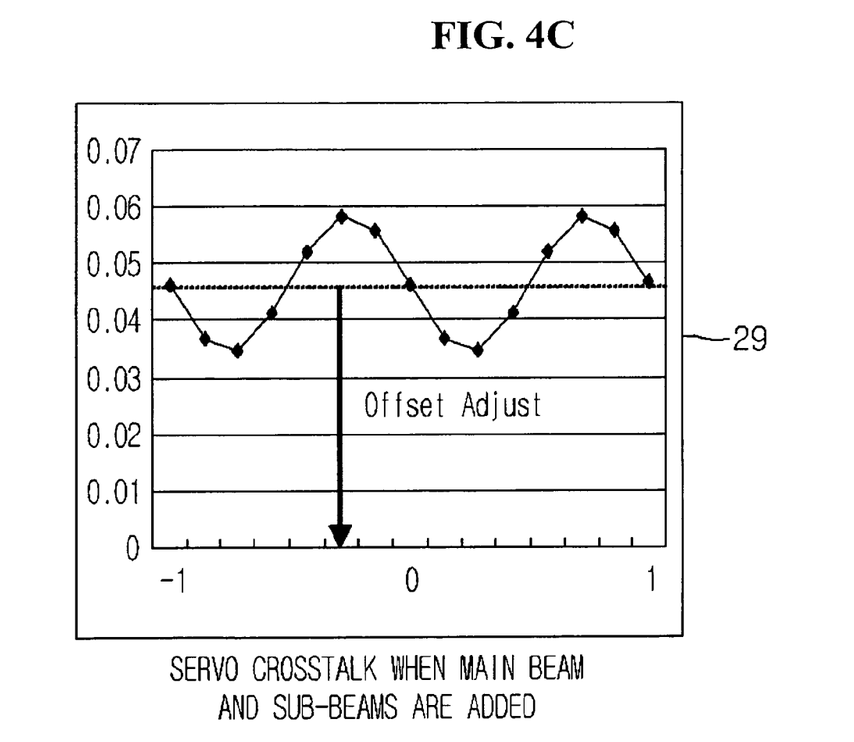

In the servo crosstalk signal 29 and 28 of FIGS. 4B and 4C, −1, 0, and +1 on an x-axis represent a lens is located on a land, a groove, and the next land of a disk, respectively. Assuming that an arbitrary standard value is determined to be 1, an y-axis represents a ration of a value to the arbitrary standard value. Here, the arbitrary standard value can be a focus error signal of the main beam, that is, a peak-to-peak value of the focus error signal 28 of FIG. 4B.

Generally, in the case where a high density disk such as a DVD RAM disk is played, a DAD process using both a main beam and sub-beams is advantageous, but the DAD process has the following limitation. That is, even though a very small change occurs over an optical pickup system (for example, the sub-beam may rotate in an R-direction, or a distance between the main beam and the sub-beam may not be suited stably) a characteristic may be worse than a control object value in view of an optical characteristic of the DAD process.

Figure 5A:
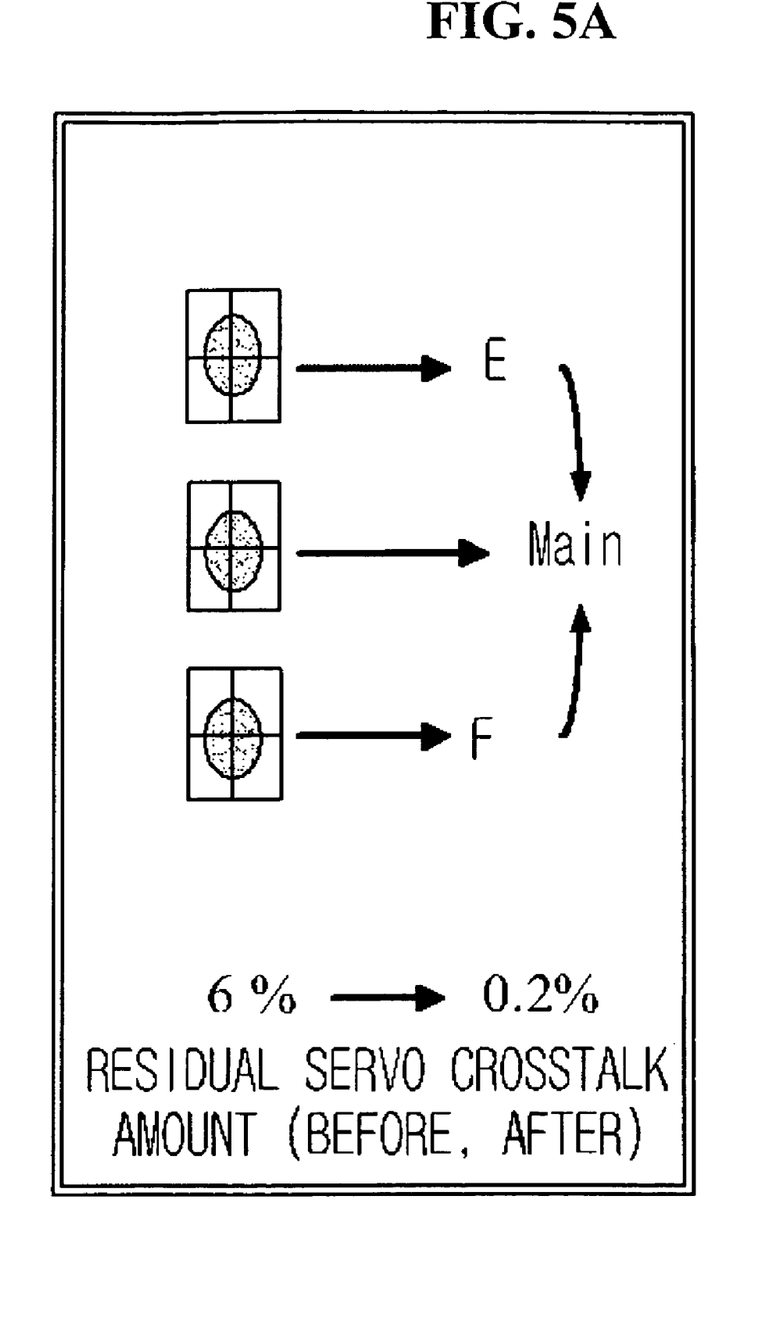
FIG. 5A is a view illustrating a reduced value in a servo crosstalk amount for a case where a main beam and sub-beams are normally aligned in a DAD process.

As a result of experiments, in the case where a beam can be aligned ideally as illustrated in FIG. 5A, a servo crosstalk generated in an AD process using only a main beam is 6%, and a servo crosstalk in a DAD process using both a main beam and sub-beams can reduce up to 0.2%.

Figure 5B:
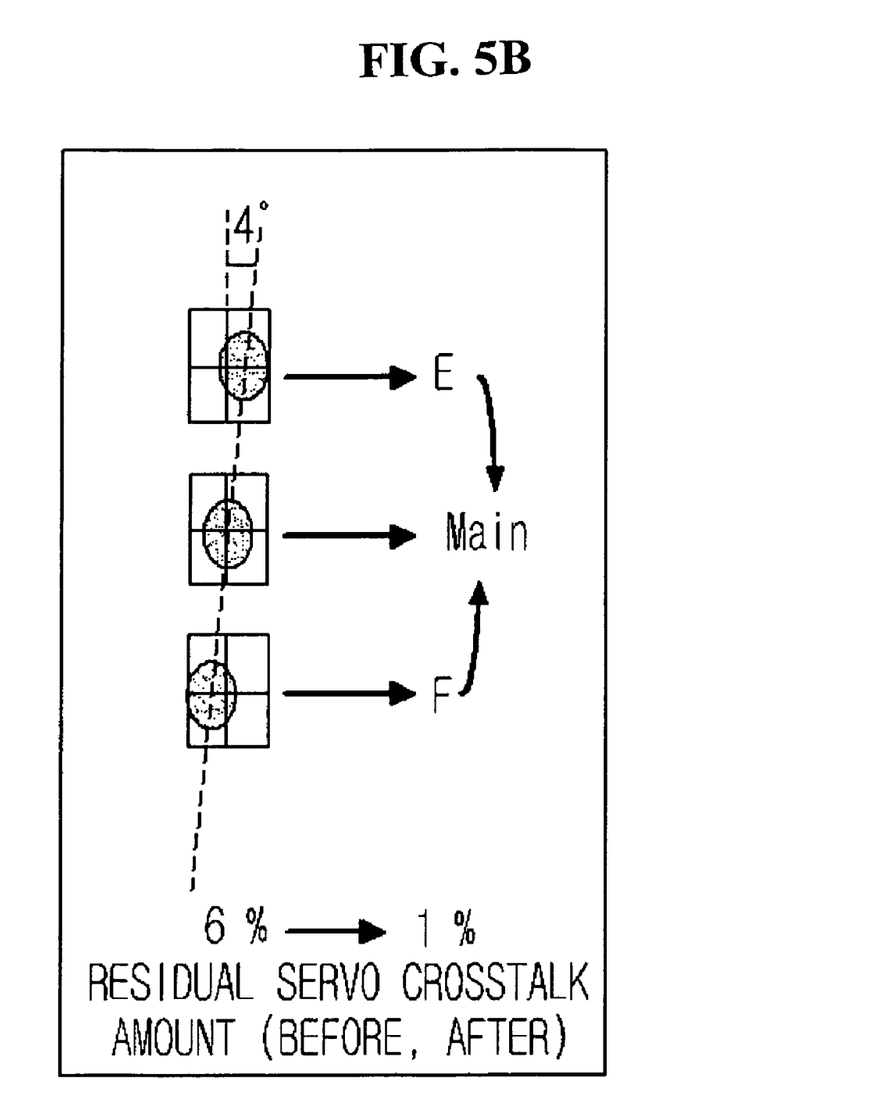
FIG. 5B is a view illustrating a reduced value in a servo crosstalk amount for a case where sub-beams (secondary beam) rotate by about 4°.
Figure 5C:
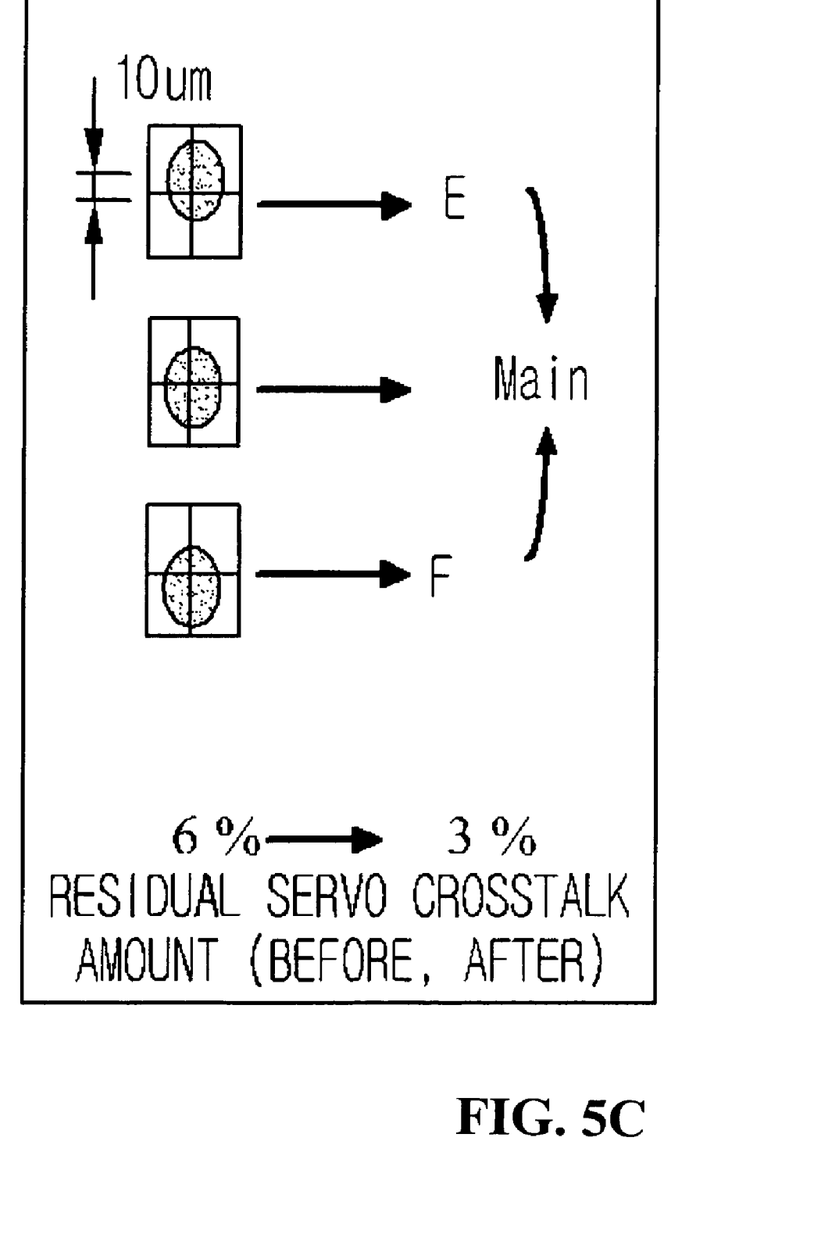
FIG. 5C is a view illustrating a reduced value in a servo crosstalk amount for a case where a distance between a main beam and a sub-beam is 10 μm.

However, in the case where a sub-beam rotates by only about 4° from an angle at which the sub-beam is aligned with the main beam due to unpredictable specific cause as illustrated in FIG. 5B, even the DAD process cannot reduce the servo crosstalk to less than 1%. Particularly, in the case where a distance between the main beam and the sub-beam is about only 10 µm, which is in the error range that can be sufficiently generated mechanically, servo crosstalk can be reduced to about 3% at best even when a DAD process is used. Therefore, efficiency reduction is so generated as to question about usefulness of using the DAD process that is complicated in comparison with the AD process.

For the above-described reason, the present disclosure is designed to allow the AD process and the DAD process to be selectively switched depending on cases when an optical pickup device performs a servo operation. In detail, a focus search is performed by at least twice as illustrated in FIG. 7.

Figure 7:
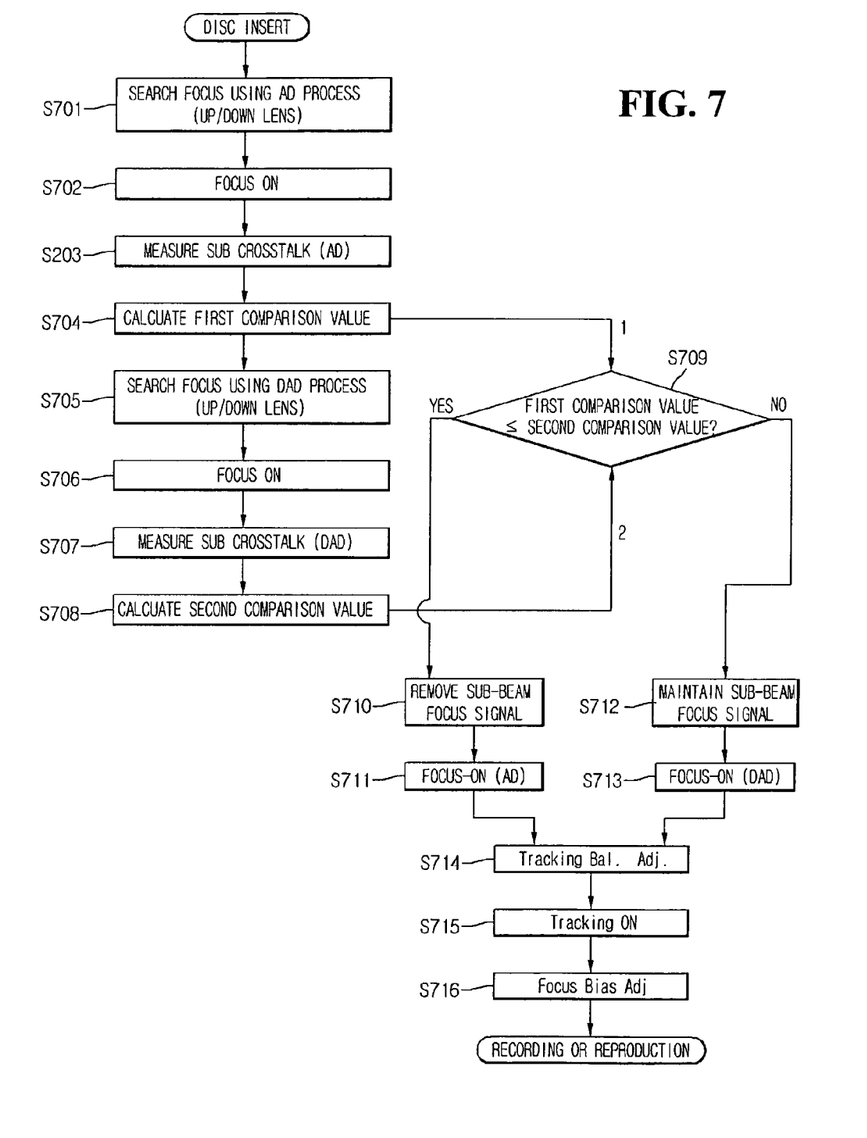
FIG. 7 is a flowchart of an optical pickup head control including a focus servo process automatic selecting method according to the present disclosure.

Referring to FIG. 7, during a focus search by an up/down operation of a lens, a focus error signal A1 is measured while a disk recognition operation of an AD process that uses only a main beam is performed initially (S701). A focus-on is completed by the up/down operation of the lens (S702). A servo crosstalk signal B1 generated during a focus-on state is measured (S703). A first comparison value V1 is calculated and stored on the basis of the measured focus error signal A1 and servo crosstalk signal B1 (S704).

The first comparison value V1 is a value representing a servo crosstalk amount after the focus-on, and can be calculated using Equation 1 below, for example.

$$V1 = B1_{p\_p}/A1_{p\_p} \times 100(\%),\qquad\text{Equation 1}$$

where $A1_{p\_p}$ is a focus error signal A1, i.e. r a peak-to-peak value of the signal 13 illustrated in FIG. 1B, and $B1_{p\_p}$ is a servo crosstalk signal B1, i.e., a peak-to-peak value of the signal 14 illustrated in FIG. 1C.

Next, a focus search is performed again by an up/down operation of the lens. At this point, a focus error signal A2 of a main beam, focus error signals of sub-beams, and a focus error signal A3 of a signal obtained by adding the main beam and the sub-beams are measured while a disk recognition operation of a DAD process that uses both the main beam and the sub-beams (S705). A focus-on is completed by an up/down operation of the lens (S706). A servo crosstalk signal B2 generated during the focus-on is measured (S707). A second comparison value V2 is calculated and stored on the basis of the measured focus error signal A2 of the main beam and servo crosstalk signal B2 (S708).

The second comparison value V2 is a value representing a servo crosstalk amount, and can be calculated using Equation 2 below, for example.

$$V2 = B2_{p\_p}/A2_{p\_p} \times 100(\%), \quad \text{Equation 2}$$

where $A2_{p\_p}$ is a focus error signal A2, i.e., a peak-to-peak value of the signal 23 illustrated in FIG. 2B, and $B2_{p\_p}$ is a servo crosstalk signal B2 generated during a focus-on, i.e., a peak-to-peak value of the signal 29 illustrated in FIG. 4C.

Selectively, the second comparison value V2 can be calculated using a focus error signal A3 of a signal obtained by adding a main beam and sub-beams, and a servo crosstalk signal B2.

That is, the second comparison value V2 can be calculated using Equation 3 below.

$$V2 = B2_{p\_p}/A3_{p\_p} \times 100(\%), \quad \text{Equation 3}$$

where $A3_{p\_p}$ is a focus error signal A3 of a signal obtained by adding the main beam and the sub-beams, i.e., a peak-to-peak value of the signal 26 illustrated in FIG. 2B, and $B2_{p\_p}$ is a servo crosstalk signal B2 generated during a focus-on, i.e., a peak-to-peak value of the signal 29 illustrated in FIG. 4C.

Next, the first comparison value is compared with the second comparison value (S709). When the first comparison value is smaller than the second comparison value, an AD process is more accurate and efficient than a DAD process which generally increases accuracy. In this case, focus error signals of sub-beams are removed (S710), and a focus-on operation is performed using the AD process (S711). After that, a series of control operations including a tracking balance control (S714), a tracking-on (S715), and a focus deviation control (S716) is performed.

When normal alignment of beams is made and the first comparison value is greater than the second alignment value, focus signals of sub-beams are maintained using the DAD process in this time (S713), and then a series of control operations including a tracking balance control (S714), a tracking-on (S715), and a focus deviation control (S716) is performed.

Figure 6:
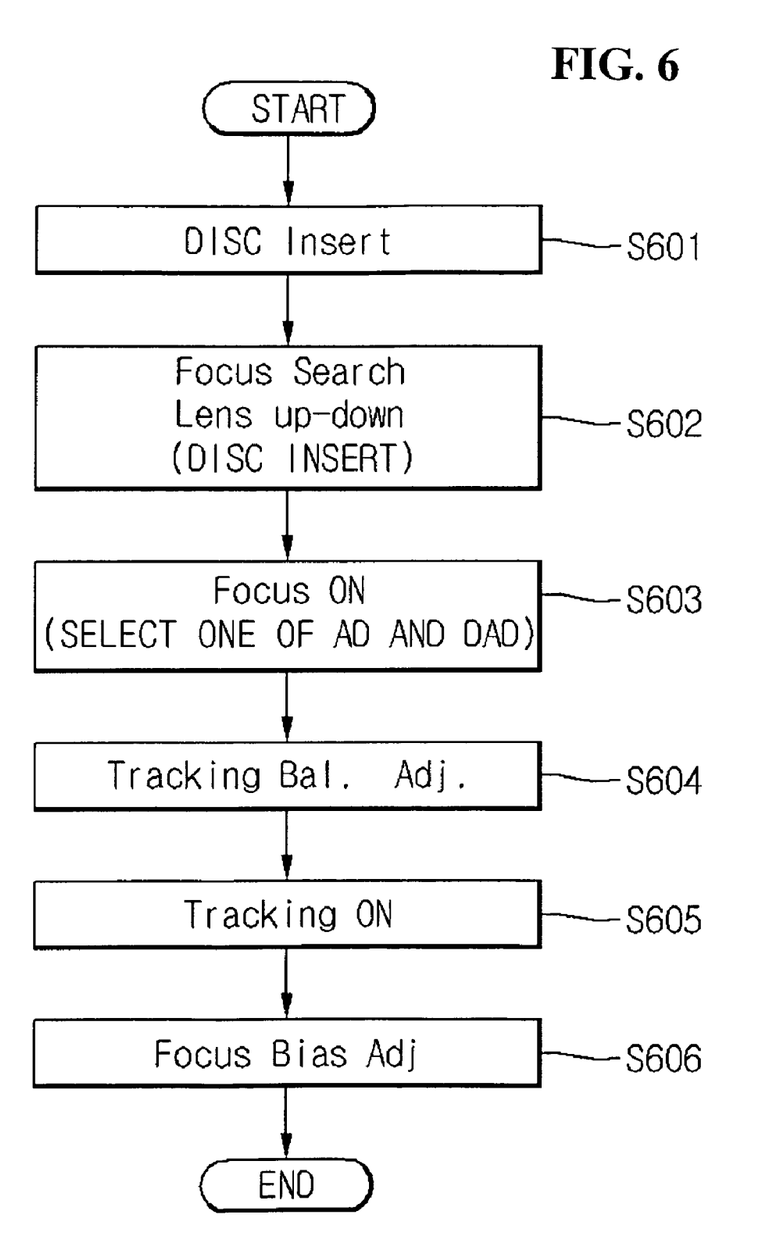
FIG. 6 is a flowchart of an optical pickup head control performed in a related art focus servo process.

Operations S601 to S606 of FIG. 6 describe a related art head control operation where the present disclosure is not mounted. Operations S601 to S606 of FIG. 6 do not include a series of operations for comparing servo crosstalk amounts and then selecting a smaller value as illustrated in FIG. 7 regardless of whether an AD process or a DAD process is selected or not.

Operations of FIG. 7 do not necessarily start with an AD process initially. When a disk that has been used during most recent reproduction or recording operation has performed a focus servo operation using a DAD process, a first operation of FIG. 7 can start with the DAD process. At this point, the first comparison value and the second comparison value can be switched to each other. That is, in the comparison section of flowchart, operations (sub-beam focus signal removing/maintenance operation) right before a tracking balance control operation is entirely switched right and left.

Likewise, a servo crosstalk amount at an initial operation may be a servo crosstalk amount by a DAD process, and a servo crosstalk amount at the next operation may be a servo crosstalk amount by an AD process.

Although embodiments have been described with reference to a number of illustrative embodiments thereof, it should be understood that the spirit of the present disclosure is not limited thereto, and it would be obvious to those skilled in the art to perform a focus servo operation using a first method, which is the spirit included in the present disclosure, to obtain a first servo crosstalk value, perform a focus servo operation using a second method to obtain a second servo crosstalk value, and compare the two servo crosstalk values to select a more effective method. Other embodiments formed by arrangement of other operations excluding the focus servo performing operation and the comparing operation, and selection of other operations would be readily realized from the above embodiments of the present disclosure.

A focus servo process automatic selecting method according to the embodiment provides the following aspects.

First, since a stable focus error signal having a small servo crosstalk is obtained, an error (misjudgment of a CD-R disk as a CD-RW disk) generation can be minimized while an inserted disk is detected.

Second, since a stable focus error signal is introduced, a stable focus control can be maintained during a recording or reproducing operation.

Third, since a focus servo is selected such that servo crosstalk is small regardless of the kind of a disk, the present disclosure can be applied to all disk drives such as CD-R/RW drives, DVD recording and reproducing systems, and HD compatible BDs. Accordingly, compatibility of an optical pickup head itself to which the above process has been mounted can be enhanced considerably.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for selecting a focus servo process, the method comprising:
    measuring a first servo crosstalk amount using a first focus servo process to calculate a first comparison value representing the first servo crosstalk amount;
    measuring a second servo crosstalk amount using a second focus servo process to calculate a second comparison value representing the second servo crosstalk amount; and
    comparing the first comparison value with the second comparison value to select a focus servo process corresponding to a smaller comparison value.

2. The method according to claim 1, wherein the calculating of the first comparison value comprises:

performing a focus-on using the first focus servo process;

measuring a focus error signal of a main beam during the performing of the focus-on;

measuring a servo crosstalk signal after the focus-on; and calculating a ratio of a peak-to-peak value of the focus error signal to a peak-to-peak value of the servo crosstalk signal.

3. The method according to claim 1, wherein the first focus servo process comprises one of a focus search process using an astigmatism detection process, and a focus search process using a differential astigmatism detection process, and the second servo focus process comprises one of the astigmatism detection process and the differential astigmatism detection process, not selected as the first focus process.

4. The method according to claim 3, wherein the calculating of the second comparison value comprises:

performing a focus-on using the second focus servo process;

measuring a focus error signal of a main beam during the performing of the focus-on;

measuring a servo crosstalk signal after the focus-on; and calculating a ratio of a peak-to-peak value of the focus error signal of the main beam to a peak-to-peak value of the servo crosstalk signal.

5. The method according to claim 3, wherein the calculating of the second comparison value comprises:

performing a focus-on using the second focus servo process;

measuring a focus error signal of a signal obtained by adding a main beam and sub-beams during the performing of the focus-on;

measuring a servo crosstalk signal after the focus-on; and calculating a ratio of a peak-to-peak value of the focus error signal of the signal obtained by adding the main beam and the sub-beams to a peak-to-peak value of the servo crosstalk signal.

6. The method according to claim 1, further comprising:

performing a focus-on operation using the selected focus servo process; and performing a tracking balance control, a tracking-on control, and a focus-deviation control according to the focus servo process.

7. The method according to claim 6, further comprising, prior to the performing of the focus-on operation, removing focus signals of sub-beams when the servo crosstalk amount of the selected focus servo process is a servo crosstalk amount measured at only a main beam.

8. A method for selecting a focus servo process, the method comprising:

measuring a first servo crosstalk amount using a most recently performed focus servo process to calculate a first comparison value representing the first servo crosstalk amount;

measuring a second servo crosstalk amount using a focus servo process different from the most recently performed focus servo process to calculate a second comparison value representing the second servo crosstalk amount;

comparing the first comparison value with the second comparison value to select a smaller servo crosstalk amount; and selecting a focus servo process corresponding to the selected servo crosstalk amount.

9. The method according to claim 8, wherein the most recently performed focus process comprises an astigmatism detection process, the calculating of the first comparison value comprises:

performing a focus-on using the astigmatism detection process;

measuring a focus error signal of a main beam during the performing of the focus-on;

measuring a servo crosstalk signal after the focus-on; and calculating a ratio of a peak-to-peak value of the focus error signal to a peak-to-peak value of the servo crosstalk signal.

10. The method according to claim 8, wherein the focus servo process different from the most recently performed focus servo process comprises a differential astigmatism detection process, and the calculating of the second comparison value comprises:

performing a focus-on using the differential astigmatism detection process;

measuring a focus error signal of a main beam during the performing of the focus-on;

measuring a servo crosstalk signal after the focus-on; and calculating a ratio of a peak-to-peak value of the focus error signal of the main beam to a peak-to-peak value of the servo crosstalk signal.

11. The method according to claim 8, wherein the focus servo process different from the most recently performed focus servo process comprises the differential astigmatism detection process, and the calculating of the second comparison value comprises:

performing a focus-on using the differential astigmatism detection process;

measuring a focus error signal of a signal obtained by adding a main beam and sub-beams during the performing of the focus-on;

measuring a servo crosstalk signal after the focus-on; and calculating a ratio of a peak-to-peak value of the focus error signal of the signal obtained by adding the main beam and the sub-beams to a peak-to-peak value of the servo crosstalk signal.

12. The method according to claim 8, further comprising:

performing a focus-on operation using the selected focus servo process; and performing a tracking balance control, a tracking-on control, and a focus-deviation control according to the focus servo process.

13. The method according to claim 12, further comprising, prior to the performing of the focus-on operation, removing focus signals of sub-beams when the servo crosstalk amount of the selected focus servo process is a servo crosstalk amount measured at only a main beam.

* * * * *